United States Patent [19]
Acker et al.

[11] 3,930,694
[45] Jan. 6, 1976

[54] BEARING FOR A VERTICAL AXLE

[76] Inventors: Martin Acker, Block V14, Jena-Neulobeda, Gera; Holm Scheufele, 32, Hanns-Eisler-Strasse, Jena-Winzerla, Gera, both of Germany

[22] Filed: Aug. 26, 1974

[21] Appl. No.: 499,101

[30] Foreign Application Priority Data
Sept. 20, 1973 Germany.......................... 1217356

[52] U.S. Cl. ................. 308/227; 33/285; 308/139; 308/188
[51] Int. Cl.² ......................................... F16C 19/04
[58] Field of Search ........... 308/139, 149, 188, 227, 308/228, 237 A, 230, 232, 285; 33/285

[56] References Cited
UNITED STATES PATENTS

| | | | |
|---|---|---|---|
| 1,302,872 | 5/1919 | Stephens | 308/227 |
| 2,622,948 | 12/1952 | Tschvdin | 308/230 |
| 2,782,512 | 2/1957 | Viale | 33/285 |
| 3,853,362 | 12/1974 | Howland | 308/230 |

*Primary Examiner*—M. Henson Wood, Jr.
*Assistant Examiner*—Richard A. Bertsch

[57] ABSTRACT

A bearing for vertical axles particular for use in goniometers comprises a non-displaceable member of an instrument on which a movable member is seated by means of a ball bearing. One of the two members possesses a cylindrical bush and the other one is provided with a journal projecting into said bush. The cylindrical region of the bush and of the journal is divided into three sections, which are sequentially arranged and in which the bush and the journal differ in their diameters. The difference of the diameters is larger in the second and smaller in the third section, if compared to the first section. The relation of the differences of diameters between the journal and the bush in the third section to the length of the third section is equal to or greater than the relation of the differences of diameters in the first section to the entire length of the cylindrical region.

1 Claim, 1 Drawing Figure

U.S. Patent  Jan. 6, 1976  3,930,694
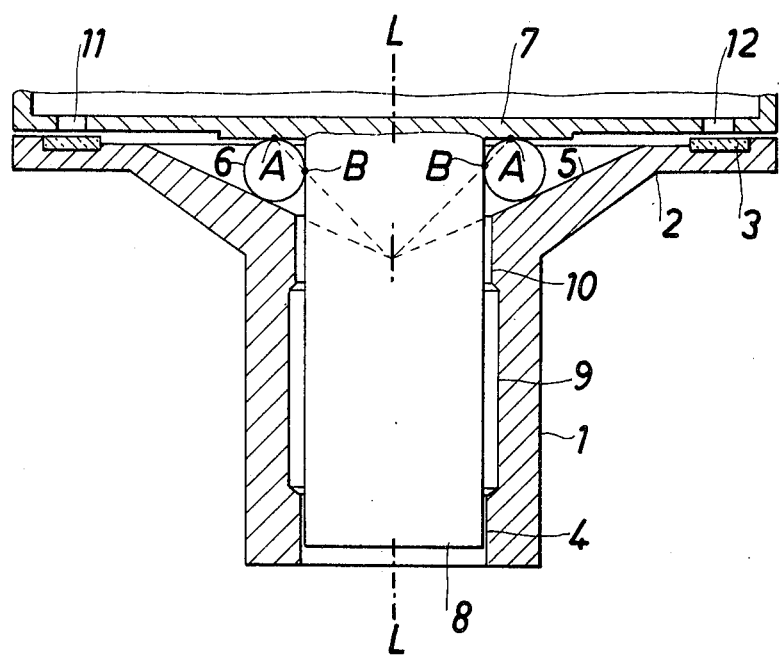

BEARING FOR A VERTICAL AXLE

The invention relates to a bearing for a vertical axle particularly for goniometers in which a movable member of an instrument is seated for rotation by means of a ball bearing on a non-displaceable member of said instrument and in which a cylindrical journal is connected with said movable member of said instrument, and a cylindrical bush, which guides the journal, is connected with said non-displaceable member.

In conventional bearings in theodolites for vertical axles most commonly the journal is secured to the rotatable alidade and the bush to the limbus.

On an upper part of the bush the alidade is seated on balls which are simultaneously and substantially responsible for the centering of the vertical axis.

Each of the balls are supported on three points, one on the journal, one on a slope of the bush and the third on the bottom face of the alidade.

The lower end of the bush is provided with a cylindrical neck intended to guide the vertical axle, else there is no contact between the axle and the bush, due to a reduction of the axle and the bush, respectively.

In all previous theodolites, having such a vertical axle, the reduction is so severe, owing to production techniques, that in the case of lateral displacements of the alidade, as a result of tolerances between the journal and the reduced portions, the journal does not contact the bush except in the reduced portion. In consequence thereof the journal moves out of the bush, by effect of the balls which roll on the slope, and uncontrollably jams in the reduced portion. This, in turn, is the cause of angular measuring errors, which in the case of high precision theodolites are considerable. The jamming of the journal depends on the displaceability of the alidade, which is substantially defined by the difference of diameters of the bush and the journal at the free end portion of the journal, as well as by the length of the portion of smallest difference of diameters, parallel to the geometrical axis of the journal.

It is an object of the invention to obviate the aforementioned disadvantages.

It is a further object to provide a bearing for a vertical axle which eliminates the jamming of the journal in the bottle necked portion of a bush, and thus uncontrolled errors in measuring operations.

Accordingly, the invention is concerned with a bearing for a vertical axle in goniometers, in which a movable member of an instrument is seated for rotation by means of a ball bearing in a non-displaceable member of said instrument and in which a cylindrical journal is connected with said movable member of said instrument, and a cylindrical bush, for receiving said journal, with the other element of the instrument. The bush is provided with a slope in the vicinity of the movable element, for fitting a ball bearing thereinto, said ball bearing surrounds said journal and contacts the journal, the bush and the member of the instrument, to which the journal is secured. The cylindrical region, which the journal and the bush have in common is divided into three sections of different diameters, which starting from the ball bearing, are sequentially arranged and in which the second section has a difference of diameter between the journal and the bush which is wider than that of the first section and the third section has a difference of diameter between the journal and the bush which is smaller than that of the first section, characterized in that the relation of the differences of the diameters to the length of the third section equals or is greater than the relation of the differences of diameters in the first section to the length of the common cylindrical range. If, for example, the diameters of journal and bush differ from each other by 1.0 $\mu$m in the third section at a length of 10 mm and if the common cylindrical portion of journal and bush has a length of 60 mm, then the difference of diameters of the journal and the bush in the first section must be $\leq$ 6 $\mu$m in order to eliminate jamming.

Due to the selected differences of diameters in the vicinity of the ball bearing the alidade with the journal may be displaced; however, the displacement is so great that it either falls short of or transgresses the difference of diameters at the free end of the bearing of the axle so that any lateral displacement of the alidade on the balls and thus a jamming of the journal in the bush are eliminated. If in the course of a measurement the force which causes the displacement is not operative, the journal self-adjusts into a central position relative to the bush.

Thus uncontrollable errors in taking angular measurements are avoided.

Advantageously an extension line of the slope of the bush and the extension of a connection line of the contact points of a ball with the journal and with the portion to which the journal is secured, have a common intersection point on the geometrical axis of the journal.

Thus the rolling friction between the balls on the one hand and the parts of the instrument in contact therewith on the other, is improved. If, for example, the journal has a diameter of 17 mm, the inclination of the slope relative to the geometrical axis of the journal will amount to 54°28' at a ball diameter of 2.5 mm.

In order that the invention may be more readily understood reference is made to the accompanying drawing which illustrates diagrammatically and by way of example one embodiment thereof and in which the FIGURE shows a schematical cross-sectional view of the device.

A bush 1 is secured to a non-displaceable part of an instrument 2 (limbus), which in turn carries a divided circle 3.

The bush 1 is provided with a guide portion 4 at its lower part, and a slope 5 at its upper part, which is adapted to receive a ball bearing 6 on which a movable part of said instrument (alidade) 7 is seated with a journal 8 in such a manner that the movable part 7 as well as the journal 8 are in contact with the ball bearing 6 at points A and B, respectively, and that the journal extends into the bush 1, and that the bush 1, the journal 8 and the ball bearing 6 have an axis L—L substantially in common, which is at the same time an axis of rotation of the movable part 7.

As can be seen from the dashed lines in the drawing, the extension of the secants, defined by the points A and B and of the slope 5 intersect each other in a point C on the axis L—L.

The bush 1 has a recess 9, and in the vicinity of the ball bearing 6, a fitting area 10, between the guide area 4 and the slope 5.

The fitting area 10, the recess 9 and the guide area 4 make up the three sections of the cylindrical area which the bush 1 and the journal 8 have in common.

The sum of their widths parallel to the axis L—L equals the width of the common cylindrical region. The recess 9 is longer than the fitting area 10 and the guide area 4.

Adjacently to the divided circle 3 and diametrically to the axis L—L two windows 11, 12 are located in the movable part 7, for passage of the path of rays which image the respective division sections into a display unit (not shown).

The ball-bearing 5 ensures a stable seating of the instrument part 7, whereas the guide areas 4 in cooperation with the journal 8 furnish a precise centering and guidance of the instrument part 7. If there were no fitting area 10, the recess 9 would extend to the slope 5, and the upper end portion of the journal 8 integral with the part 7 of the instrument would be considerably more displaced in the direction of and due to a force at right angles to the axis L—L, in the course of operation, than the lower end portion, because the difference of the diameters between the journal 8 and the recess 9 is, in the sense of an easy production, considerably larger than between the journal 8 and the guide area 4.

In consequence thereof the part 7 integral with the ball bearing 6 moves on the slope 5 until the circular edge is arrested at the free end portion of the guide area 4.

A further increase of the pressure would even urge the edge into the guide area 4 and jam it.

The same or a reduced proportion of the difference of diameters of the journal 8 and the bush 1 relative to the width of the common cylindrical range at the upper portion of the fitting area 10, to the relation of the difference of diameters to the width at the fitting area 4 generally eliminates a jamming.

The fitting area 10 eliminates any displacement or inclination of the part 7 and thus of the journal 8, other than permitted by the difference of diameters of the journal 8 and the guide area 4. Thus the journal 8 sets up coaxially to the axis L—L when the lateral force ceases.

The invention is not restricted to the above described embodiment.

It is feasible, for example, to provide the bush at the movable part of the instrument and the journal at the non-displaceable part.

Furthermore, the guide area 4, the recess 9, in this case, however, as a collar portion, and the fitting area 10 can be provided at the journal, whereas the bush 1 has a plane internal surface. And finally, it is feasible to have the fitting area, the guide area and the recess (collar) partially at the journal and partially on the bush.

We claim:

1. A bearing for vertical axle, particularly for goniometers comprising
    a non-displaceable member of an instrument,
    a bush being provided on said non-displaceable member,
    a movable member of an instrument,
    a cylindrical journal being rigidly connected to said movable member,
        said bush being cylindrically and having a conical extension on its end portion adjacent to said movable member of said instrument,
and a ball-bearing, surrounding said journal and being located in said conical extension, being in contact with said movable member, said journal, and said conical extension, said journal and said bush having a cylindrical region in common, said region being subdivided into three subsequent sections of different diameters, the first of said sections being located nearest relative to said ball bearing, and the third of said sections being remotely located from said ball bearing, said second section being longer than said first and said third section, said journal and said bush having a diameter difference in the second section which is greater than that of the first section, the diameter difference in said third section being smaller than that of the first section, the differences of diameters between said journal and said bush in said third section related to the length of said third section being at least equal to the relation of the difference of diameter in said first section to the length of the common cylindrical region.

* * * * *